(12) United States Patent
Shaffer et al.

(10) Patent No.: US 8,675,847 B2
(45) Date of Patent: Mar. 18, 2014

(54) SCALABLE CONFERENCE BRIDGE

(75) Inventors: Shmuel Shaffer, Palo Alto, CA (US); Labhesh Patel, San Francisco, CA (US); Mukul Jain, San Jose, CA (US); Sanjeev Kumar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1483 days.

(21) Appl. No.: 11/649,528

(22) Filed: Jan. 3, 2007

(65) Prior Publication Data

US 2008/0159179 A1 Jul. 3, 2008

(51) Int. Cl.
*H04M 3/56* (2006.01)
(52) U.S. Cl.
USPC ...... 379/158; 379/202.01; 709/204; 370/260; 370/261
(58) Field of Classification Search
USPC .......... 379/202.01, 157, 158, 207.02, 112.05, 379/112.06; 709/204; 370/260, 261
See application file for complete search history.

(56) References Cited

U.S. PATENT DOCUMENTS

| | | | | |
|---|---|---|---|---|
| 5,825,858 | A * | 10/1998 | Shaffer et al. | 379/120 |
| 6,754,321 | B1 * | 6/2004 | Innes et al. | 379/201.03 |
| 2002/0078153 | A1 * | 6/2002 | Chung et al. | 709/204 |
| 2003/0028647 | A1 * | 2/2003 | Grosu | 709/227 |
| 2004/0210637 | A1 * | 10/2004 | Loveland | 709/204 |
| 2004/0267938 | A1 * | 12/2004 | Shoroff et al. | 709/227 |
| 2007/0041366 | A1 * | 2/2007 | Vugenfirer et al. | 370/352 |

FOREIGN PATENT DOCUMENTS

EP 0 959 585 11/1999
EP 959585 A2 * 11/1999

OTHER PUBLICATIONS

International Search Report and Written Opinion dated May 5, 2008 from corresponding PCT Application No. PCT/US07/87530.
"Implementing Media Gateway Control Protocols" A RADVision White Paper, Jan. 27, 2002. 16 pp.
Toga, J. And ElGebaly, H.,"Demystifying Multimedia Conferencing Over the Internet Using the H.323 Set of Standards," Intel Technology Journal Q2 1998, 11 pp.
"A Primer on the H.323 Series Standard," Version 2.0, http://www.packetizer.com/voip/h323/papers/primer/ Downloaded from the Internet Dec. 20, 2006, 17 pp.

* cited by examiner

*Primary Examiner* — Ahmad Matar
*Assistant Examiner* — Jirapon Intavong
(74) *Attorney, Agent, or Firm* — Novak Druce Connolly Bove + Quigg LLP (57) ABSTRACT

In one embodiment, a conference bridge receives a call initiated by a first caller endpoint. The conference bridge identifies a conference to which the call requests entry and determines whether the conference bridge has available resources to process the call. The conference bridge enables the call to join the conference via a second conference bridge associated with a second caller endpoint participating in the conference according to whether the conference bridge has available resources to process the call.

28 Claims, 5 Drawing Sheets

SCALABLE CONFERENCE BRIDGE

BACKGROUND

1. Technical Field

The present disclosure relates generally to methods and apparatus for processing conference calls.

2. Description of the Related Art

Participants of a conference call typically connect to a conference via a conference bridge. More particularly, each participant is typically connected to a different port of the conference bridge. In order to ensure that there are sufficient resources for the participants of a conference, the conference bridge typically reserves a specific number of ports for the expected number of participants. However, it is difficult to predict the number of ports that will be needed for a given conference. In addition, since a conference bridge may simultaneously support multiple conferences that may begin and end at different times, it is difficult to divide the resources of the conference bridge among the conferences. Consequently, conferences are often either under or over subscribed, resulting in either a waste of conference resources or an inability of users to join a conference due to insufficient resources.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Overview

In accordance with one embodiment, a conference bridge receives a call initiated by a first caller endpoint. The conference bridge identifies a conference to which the call requests entry and determines whether the conference bridge has available resources to process the call. The conference bridge enables the call to join the conference via a second conference bridge associated with a second caller endpoint participating in the conference according to whether the conference bridge has available resources to process the call.

In accordance with another embodiment, a caller endpoint having a conference bridge associated therewith receives a call, the call requesting entry to a conference and being initiated by a caller endpoint. The caller endpoint having the conference bridge determines whether it is connected to the conference. If the caller endpoint having the conference bridge is connected to the conference, the conference bridge connects the caller endpoint that initiated the call to the conference.

Specific Example Embodiments

The disclosed embodiments enable an interested user to join a conference call (i.e., conference), even when a conference bridge that has received a call from the user is unable to connect the user to the conference due to insufficient resources. This is accomplished by enabling the conference bridge to transfer, forward, or otherwise direct the call to another conference bridge. In this manner, conference resources are managed without wasting conference resources.

Figure 1:
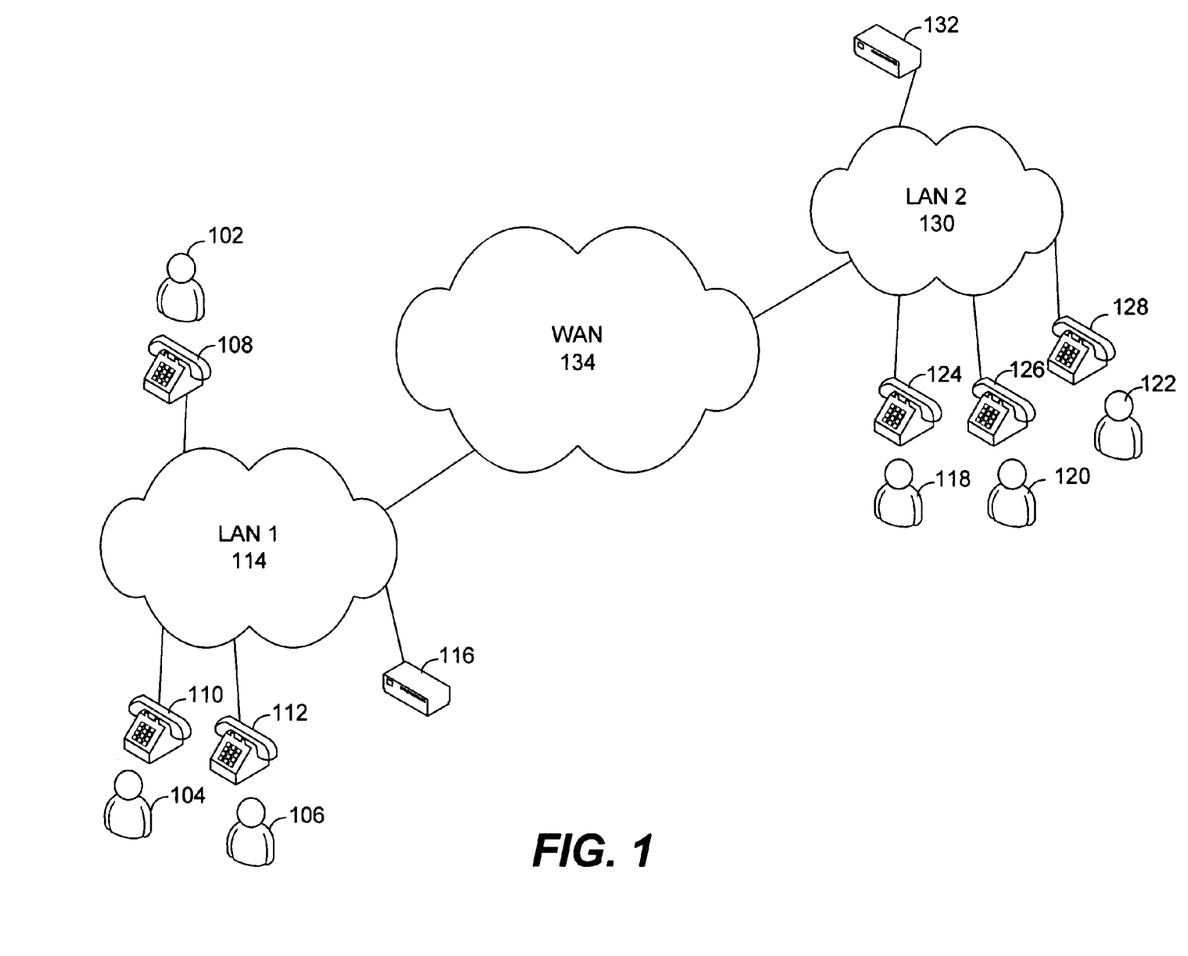
FIG. 1 is a block diagram illustrating an example system for processing conference calls.

FIG. 1 is a block diagram illustrating an example system for processing conference calls. A number of users 102, 104, 106 may attempt to join a conference via corresponding caller endpoints 108, 110, 112, respectively, which are coupled to a network 114 such as a local area network (LAN), shown here as LAN 1. Each of the caller endpoints 108, 110, 112 may be implemented via a device such as a telephone, cellular phone, or other device capable of processing, receiving, and/or transmitting voice signals in accordance with a protocol such as Voice over IP or other suitable protocol. A conference call is typically processed via a conference bridge such as conference bridge 116, which is shown here coupled to LAN 1 114.

Similarly, users 118, 120, 122 may attempt to join the same conference via corresponding caller endpoints 124, 126, 128, respectively, which are coupled to a second network 130 such as LAN 2. Each of the caller endpoints 118, 120, 122 may be implemented via a device such as a telephone, cellular phone, soft phone, or other device capable of processing, receiving, and/or transmitting voice or multimedia signals in accordance with a protocol such as Voice over IP or other suitable protocol. When the users 118, 120, 122 call into the conference, conference bridge 132, shown coupled to the second network, LAN 2 130, may receive the call. A third network 134, which may be a wide area network (WAN), may support communication between the network 114 and the second network 130.

In order to join a conference, a user dials a number that initiates a call to a conference bridge. The user may enter his or her name, meeting identifier, and a password. The conference bridge determines whether it has available resources (e.g., ports) to process the call. If the conference bridge has available resources (e.g., an available port), the conference bridge accepts the call such that the call joins the conference.

For example, user 102 may join the conference, followed by user 104. Upon connecting user 102 and 104 to the conference, the conference bridge 116 may have no further available resources due to other participants to the conference and/or other conferences. Although user 106 also dials in to participate in the conference, the conference bridge 116 is unable to connect another participant to the conference. As a result, the conference bridge 116 transfers, forwards, or otherwise directs the call to another conference bridge. For instance, the conference bridge 116 may identify one or more available conference bridges prior to transferring, forwarding, or otherwise directing the call to one of those conference bridges.

In this example, the conference bridge 116 may direct the call to the conference bridge 132. However, although the conference bridge 132 may have available resources (e.g., ports) to accept the call, the conference bridge 132 is in a different network. As a result, it may be impossible to connect user 106 to the conference via the conference bridge 132. Moreover, connecting user 106 to the conference via the conference bridge 132 would introduce substantial delay. As a result, it may be desirable to connect user 106 to the conference via another conference bridge that is closer to the user 106.

In accordance with one embodiment, one or more caller endpoints such as one or more of the caller endpoints 108, 110, 112 and 124, 126, 128 may include a conference bridge. Thus, the conference bridge 116 may choose one of the available conference bridges of a caller endpoint to connect user 106 to the conference, such as the conference bridge of the caller endpoint 110.

A conference bridge typically includes two components. The first component is a multipoint controller (MC) and the second component is a media processor (MP). The multipoint controller typically performs processing in the control plane, while the media processor typically performs processing in the data plane (e.g., voice or multimedia processing). The MP and the MC may reside on the same network device (e.g., server) or, alternatively, the MP and the MC may reside on different network devices coupled to the network. A conference bridge may operate in accordance with a protocol such as the H.323, Session Initiation Protocol (SIP), or other suitable standard or proprietary protocol.

Figure 2A:
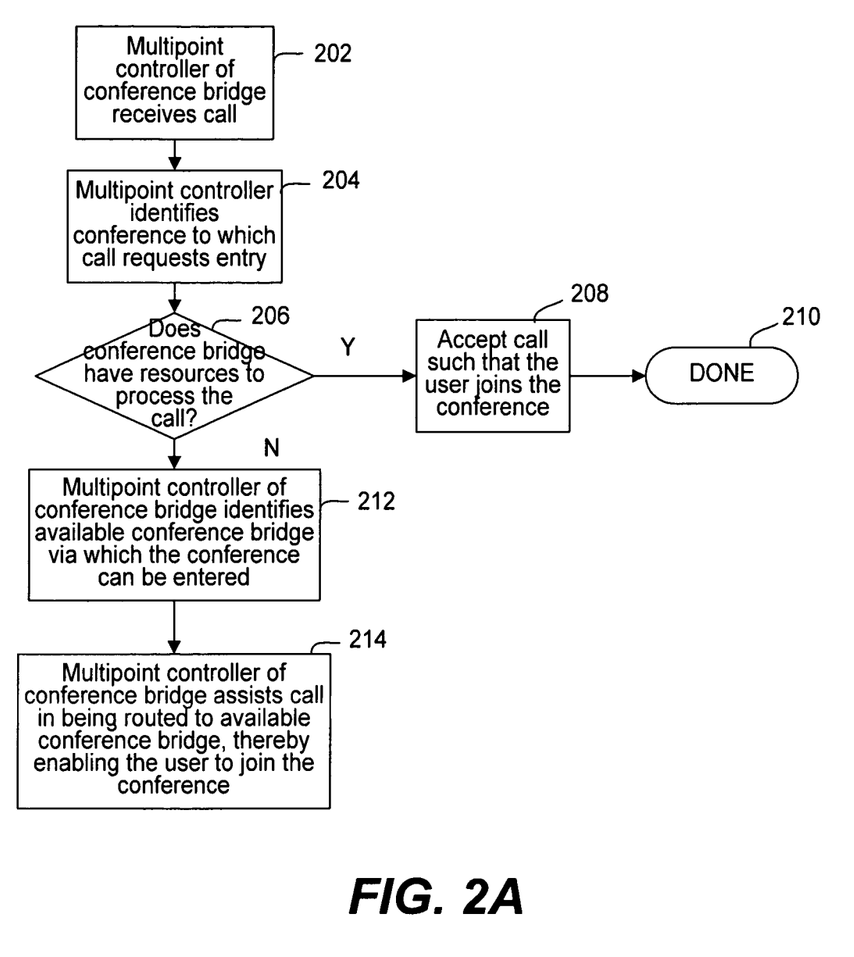
FIGS. 2A-2C together illustrate an example method of processing a call by a conference bridge.
Figure 2B:
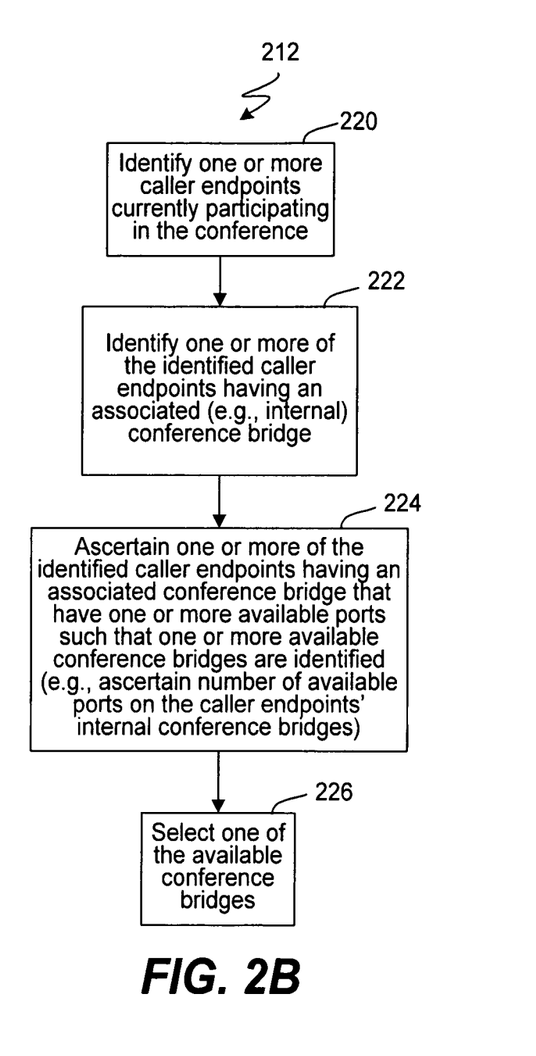
Figure 2C:
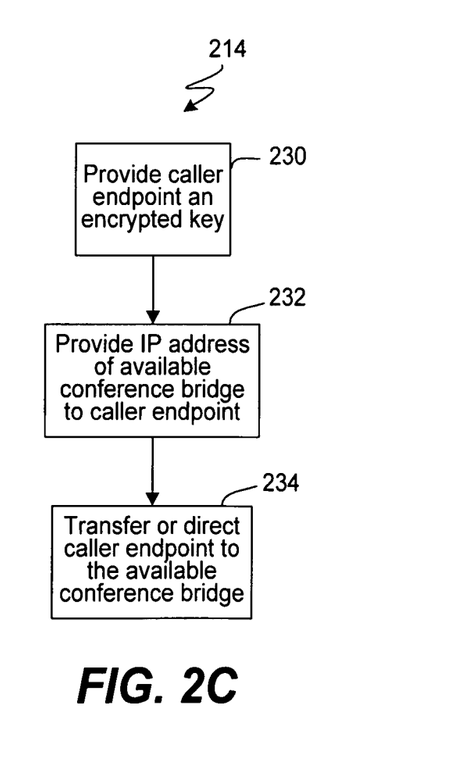

FIGS. 2A-2C together illustrate an example method of processing a call by a conference bridge. As shown in FIG. 2A, when a user attempts to call into the conference via a caller endpoint, a conference bridge receives the call at 202. More particularly, the multipoint controller of the conference bridge may receive the call. When the conference bridge receives the call, the conference bridge may obtain one or more parameters during call setup using a protocol such as the Session Initiation Protocol (SIP). In addition, the conference bridge (e.g., multipoint controller) may also identify the conference to which the user and corresponding call requests entry at 204. More particularly, the conference bridge may identify the conference via a conference identifier entered by the user.

The conference bridge may also determine whether it has available resources to process the call at 206. For instance, the multipoint controller of the conference bridge may determine whether the conference bridge has one or more available ports via which the call may be connected to the conference. The conference bridge may then enable the call to join the conference according to whether the conference bridge has available resources to process the call, as will be described in further detail below. If the conference bridge has available resources to process the call, the conference bridge accepts the call such that the call joins the conference at 208 and the process ends at 210. However, if the conference bridge does not have available resources to process the call, the conference bridge (e.g., multipoint controller) identifies an available conference bridge via which the conference can be entered at 212, as will be described in further detail below with reference to FIG. 2B. The conference bridge (e.g., multipoint controller) may then assist the call in being routed to the available conference bridge at 214, thereby enabling the user to join the conference. An example method of assisting the call in being routed to the available conference bridge will be described in further detail below with reference to FIG. 2C.

FIG. 2B is a process flow diagram illustrating an example method of identifying an available conference bridge via which the conference can be entered as shown at 212 of FIG. 2A. As set forth above, a caller endpoint may have an associated (e.g., internal) conference bridge. Thus, the user may be connected to the conference via a conference bridge of another caller endpoint. However, in accordance with one embodiment, if that caller endpoint (and therefore the internal conference bridge) is not participating in the conference, the associated conference bridge cannot be used to connect to the conference. Thus, the conference bridge may identify one or more caller endpoints currently participating in the conference at 220. For instance, the conference bridge may check a database for the identity of the currently participating caller endpoints in the conference. However, all caller endpoints need not have an associated conference bridge. Thus, the conference bridge may also identify one or more of the identified caller endpoints having an associated conference bridge at 222.

The conference bridge may identify those caller endpoints having an associated conference bridge from data that has previously been configured. The data that has been configured may explicitly identify one or more caller endpoints having an associated conference bridge. Alternatively, the data that has been configured may include data such as the type and/or model of the endpoint from which the existence of an associated conference bridge may be implied.

Alternatively, the conference bridge may identify those caller endpoints having an associated conference bridge from data that has been obtained during call setup that indicates whether a caller endpoint has an associated conference bridge. More particularly, a caller endpoint may notify another device (e.g., caller endpoint or conference bridge) that it has an internal conference bridge as part of a capability exchange. Such a notification may explicitly indicate that the caller endpoint has an internal conference bridge. The notification may also include information such as the type and/or model of the endpoint from which the existence of an internal conference bridge may be implied. In this manner, the notification may indicate that the caller endpoint has conferencing resources that can be made available to the conference bridge, thereby enabling the conference bridge to extend its capacity to process calls that it receives.

Even if a caller endpoint having an associated conference bridge is currently participating in the conference, that caller endpoint may not have available resources at that time. Thus, the conference bridge may ascertain one or more of the identified endpoints having an associated conference bridge that have one or more available ports such that one or more available conference bridges are identified at 224. The conference bridge may then select one of the identified available conference bridges at 226. For instance, the conference bridge may select an available conference bridge via which to connect the user to the conference in accordance with various criteria. Thus, the conference bridge may apply various algorithms to select a conference bridge in accordance with one or more criteria.

Criteria for selecting a conference bridge may include the amount of available resources (e.g., ports). A conference bridge that has received a call may directly or indirectly determine the amount of available resources of another conference bridge. For instance, the conference bridge that has received the call may approximate the amount of resources that are available according to the type and/or model of device having the available conference bridge. More particularly, each type of device typically includes a specific amount of resources (e.g., number of ports). Thus, it may be desirable to identify the type of device in which the available conference bridge is implemented. For instance, the type of device may be identified as part of call set up when a call is received.

It may also be desirable to select a conference bridge in accordance with the quality of the connection that is likely to be established via that conference bridge. The conference bridge that has received a call may determine the quality of the connection that is likely to be established via an available conference bridge based upon voice quality, link quality, quality of service, bandwidth considerations, and/or the distance between the available conference bridge and the caller endpoint that initiated the call. The conference bridge that has received the call may determine link quality by obtaining one or more parameters when the call is received, such as parameters indicating an amount of packet loss or echo. The conference bridge that has received the call may similarly obtain the Quality of Service as a parameter when the call is received. Bandwidth considerations may include the ability to perform bandwidth reservations, the available bandwidth between the various caller endpoints, the available bandwidth between the caller endpoint that initiated the call and the conference bridge that has received the call, and/or the available bandwidth between the conference bridge that has received the call and the available conference bridge being considered. The conference bridge that has received the call may determine voice quality dynamically using a real-time voice quality algorithm such as ITU P.VTQ or P.563. The conference bridge that has received the call may ascertain the distance between the available conference bridge being considered and the caller endpoint that initiated the call by determining the number of hops between the caller endpoint and the available conference bridge. More particularly, the conference bridge that has received the call may determine the number of hops between the caller endpoint and the available conference bridge by adding the number of hops between the caller endpoint and the conference bridge that received the call to the number of hops between the conference bridge that received the call and the available conference bridge being considered. In this manner, the conference bridge may select the closest caller endpoint having an associated conference bridge.

FIG. 2C is a process flow diagram illustrating an example method of assisting a call in being routed to an available conference bridge as shown at 214 of FIG. 2A. In order to ensure that the user has been authorized to access the conference, it may be desirable to generate and/or provide a key for use by the available conference bridge in authenticating the user for entry into the conference. For instance, the conference bridge that has received the call may generate a key or obtain a key corresponding to the user and conference. The conference bridge may use a variety of key distribution protocols such as Transport Layer Security (TLS) protocol to generate and distribute the key to one or more entities, such as the caller endpoint and/or the available conference bridge. In order to protect the key, the conference bridge or entity that has generated the key may encrypt the key. Thus, the conference bridge may provide an encrypted key to the caller endpoint via which the user has attempted to dial into the conference at 230, enabling the caller endpoint to provide the key to the available conference bridge. The conference bridge may also provide a telephone number and/or an IP address of the available conference bridge to the caller endpoint at 232, enabling the caller endpoint to connect to the available conference bridge. The conference bridge may also transfer or otherwise direct the caller endpoint to the available conference bridge at 234. When the call is transferred to the available conference bridge, the conference bridge may provide the identity of the user, password, meeting identifier and/or key to the available conference bridge. Thus, the transfer may be performed automatically and seamlessly.

Figure 3:
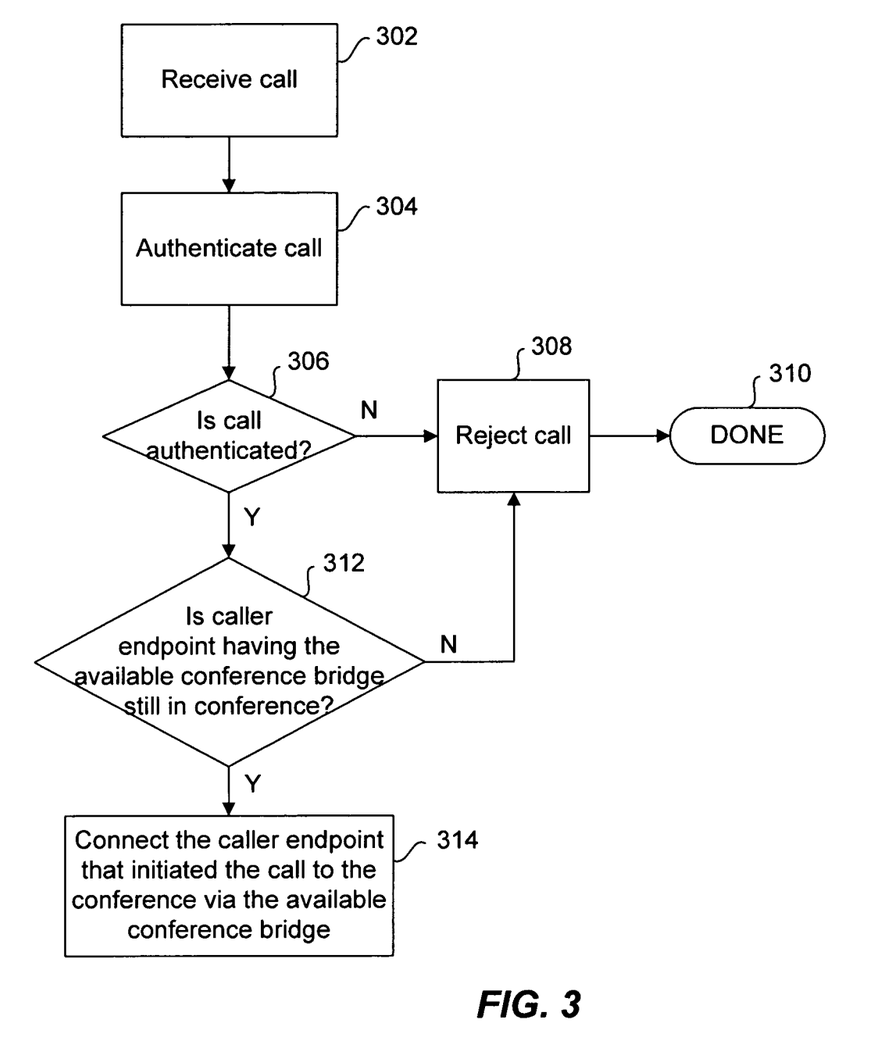
FIG. 3 is a process flow diagram illustrating an example method of processing a call that has been directed to an available conference bridge.

FIG. 3 is a process flow diagram illustrating an example method of processing a call that has been directed to an available conference bridge. As set forth above, the available conference bridge may be internal to a network device such as a caller endpoint. The network device receives the call requesting entry to a conference at 302, where the call was previously initiated by a caller endpoint. The network device may then authenticate the call at 304. More particularly, the network device may perform authentication to ensure that the caller endpoint is authorized to participate in the conference. For example, the network device may authenticate the call using a key associated with the call, as set forth above. The network device may perform authentication internally or by contacting another network device. For instance, the network device may contact another network device adapted for performing authentication. As another example, the network device may perform authentication by contacting the conference bridge via which the call was received. In this manner, the network device may authenticate the caller endpoint for use of its conferencing resources. The network device may determine whether the call has been successfully authenticated at 306. If the call has not been successfully authenticated, the call may be rejected at 308 and the process ends at 310.

Even if the call has been successfully authenticated, it is possible that the caller endpoint having the available conference bridge is no longer connected to the conference. Thus, the network device determines whether the caller endpoint having the available conference bridge is still connected to the conference at 312. In accordance with one embodiment, if the caller endpoint is no longer connected to the conference, the conference bridge of the caller endpoint cannot accept the call. Therefore, the available conference bridge of the caller endpoint may reject the call at 308, and the process ends at 310. Alternatively, the available conference bridge of the caller endpoint may transfer or otherwise direct the call to another available conference bridge in a manner similar to that set forth above with reference to FIGS. 2A-2C.

If the caller endpoint having the available conference bridge is still connected to the conference (and it has available resources to process the call), the available conference bridge connects the caller endpoint that initiated the call to the conference at 314. Thus, the audio or multimedia signals associated with each of the caller endpoints participating in the conference may be "mixed."

As described above, upon receiving a call, a conference bridge may either process that call or transfer the call to an available conference bridge. The available conference bridge may be a conference bridge internal to a caller endpoint. An example of a conference bridge will be described with reference to FIG. 4, while an example of a caller endpoint will be described with reference to FIG. 5.

Figure 4:
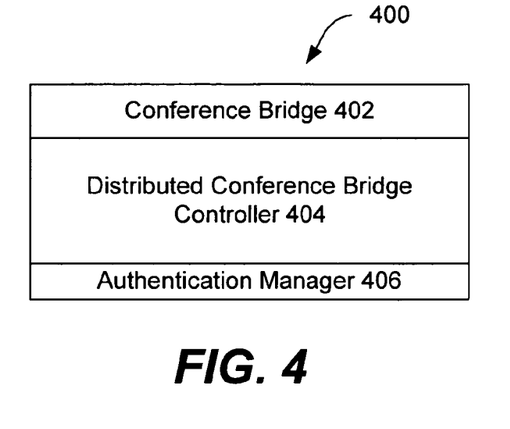
FIG. 4 is an example diagram representing functions that may be performed by a conference bridge.

FIG. 4 is an example diagram representing functions that may be performed by a conference bridge. Conference bridge 400 may include functionalities typically performed by a standard conference bridge 402. The conference bridge 400 may also include a distributed conference bridge controller 404 adapted for performing operations described above with reference to FIGS. 2A-2C. The conference bridge 400 may also include an authentication manager 406.

The authentication manager 406 may generate and/or obtain a key, as well as encrypt the key. The authentication manager 406 may then provide the key to the caller endpoint that has initiated the call and/or the available conference bridge/caller endpoint to which the call is being directed. The conference bridge or caller endpoint to which the call has been directed may request that the authentication manager 406 authenticate the call using the key.

Figure 5:
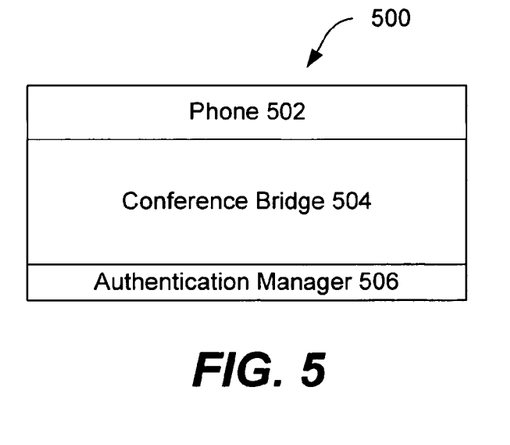
FIG. 5 is an example diagram representing functions that may be performed by a caller endpoint.

FIG. 5 is an example diagram representing functions that may be performed by a caller endpoint. Caller endpoint 500 may include functionalities typically performed by a telephone 502. More particularly, such functionalities may include receiving voice or multimedia signals, processing voice or multimedia signals, and transmitting voice or multimedia signals. For instance, the voice or multimedia signals may be transmitted and received via a standard transmission medium using a protocol such as Voice over IP.

In addition, the caller endpoint 500 may also include or otherwise have associated therewith a conference bridge 504 such as a standard conference bridge (or the functionality of a standard conference bridge) such as a multimedia conference bridge. In some embodiments, the conference bridge 504 includes or has associated therewith a distributed conference bridge controller 404 (not shown) capable of transferring the call to another caller endpoint should the caller endpoint 500 be unable to process the call. The caller endpoint 500 may also include an authentication manager 506.

The authentication manager 506 may authenticate a call that has been transferred to the caller endpoint 500. For instance, the authentication manager 506 may authenticate the call using a key, which may have been encrypted. Thus, the authentication manager 506 may decrypt the key. The authentication manager 506 may authenticate the call internally to the caller endpoint 500 or the authentication manager 506 may authenticate the call by contacting another network device. For instance, the authentication manager 506 may communicate with the conference bridge 400 to request that the call be authenticated.

The above-described embodiments enable a user to gain access to a conference without needing to reserve resources. This is accomplished via an intelligent conference bridge capable of identifying an alternate conference bridge via which the user can connect to the conference. Where the alternate conference bridge is a conference bridge of a caller endpoint, resources associated with conference participants are leveraged. In this manner, conferencing ability may be scaled with the number of caller endpoints participating in a conference.

Various network devices may be configured or adapted for performing the disclosed functionality. These network devices include, but are not limited to, conference bridges, caller endpoints (e.g., telephones) including conference bridges, and soft phones with multimedia conferencing capabilities. Moreover, the functionality for the disclosed processes may be implemented in software, hardware, or any combination of hardware and software.

Yet another embodiment of the invention pertains to computer program products including machine-readable media on which are provided program instructions for implementing the methods and techniques described herein, in whole or in part. Any of the methods described herein may be represented, in whole or in part, as program instructions that can be provided on such machine-readable media. In addition, the disclosed embodiments pertain to various combinations and arrangements of data generated and/or used as described herein. For example, structures having the format described herein and provided on appropriate media are part of this disclosure.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. For instance, a conference call may also include video signals, as well as audio signals. Thus, although various operations are described as being performed by hardware or software, these operations are merely illustrative and therefore these operations may be performed in an alternate manner. Moreover, the disclosed embodiments need not be performed using the steps described above. Accordingly, the disclosed techniques may be performed in an alternate manner, as well as be implemented using other mechanisms and data structures.

In addition, although examples of conference bridges such as multimedia conference bridges and caller endpoints are described, the above-described embodiments may be implemented in a variety of network devices. For instance, a caller endpoint may be any network device capable of processing, transmitting and/or receiving voice or multimedia signals. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
receiving a call by a conference bridge, the call being initiated by a first caller endpoint;
identifying by the conference bridge a conference to which the call requests entry;
determining by the conference bridge whether the conference bridge has available resources to process the call; and
enabling the call to join the conference via either the conference bridge or a second conference bridge of a second caller endpoint participating in the conference according to whether the conference bridge has available resources to process the call;
wherein enabling the call to join the conference comprises:
if it is determined that the conference bridge does not have available resources to process the call, identifying an available conference bridge via which the conference can be entered and assisting the call in being routed to the available conference bridge;
wherein identifying an available conference bridge via which the conference can be entered includes:
identifying one or more caller endpoints currently participating in the conference;
identifying one or more of the identified caller endpoints that include a conference bridge;
ascertaining one or more of the identified caller endpoints that include a conference bridge having one or more available ports such that one or more available conference bridges are identified; and
selecting one of the identified available conference bridges;
wherein each of the one or more caller endpoints currently participating in the conference includes a telephone, a cellular phone, soft phone, or is otherwise capable of receiving and transmitting voice in accordance with Voice over IP.

2. The method of claim 1, wherein information identifying a set of one or more caller endpoints that include conference bridges is configured or received during call setup as part of capability exchange between the caller endpoints and the conference bridge that has received the call;
wherein identifying one or more of the identified caller endpoints that include a conference bridge is performed based, at least in part, upon the information.

3. The method as recited in claim 2, wherein the information identifying the one or more caller endpoints that include conference bridges includes at least one of a type or model of the second caller endpoint.

4. The method as recited in claim 1, wherein the available resources include one or more available ports.

5. The method as recited in claim 1, further comprising:
providing a key to the first caller endpoint, thereby enabling the first caller endpoint to provide the key to the second conference bridge of the second caller endpoint participating in the conference to enable the first caller endpoint to gain access to the conference via the second conference bridge of the second caller endpoint.

6. The method as recited in claim 1, further comprising:
receiving a notification from the second caller endpoint, the notification indicating that the second caller endpoint includes conferencing resources that can be made available to the conference bridge, thereby enabling the conference bridge to extend its capacity to process calls that it receives.

7. The method as recited in claim 1, wherein identifying an available conference bridge via which the conference can be entered comprises:
identifying one of a plurality of available conference bridges according to an amount of available resources and a distance between the first caller endpoint and the second caller endpoint.

8. The method of claim 1, wherein each of the identified caller endpoints that include a conference bridge is a telephone or cellular phone.

9. The method of claim 1, wherein each of the caller endpoints is a telephone or cellular phone.

10. The method of claim 1, wherein each of the identified caller endpoints that include a conference bridge is capable of receiving and transmitting voice in accordance with Voice over IP.

11. The method of claim 1, wherein each of the caller endpoints is capable of receiving and transmitting voice in accordance with Voice over IP.

12. The method of claim 1, wherein at least one of the caller endpoints currently participating in the conference does not include a conference bridge.

13. An apparatus, comprising:
a processor; and
a memory, at least one of the processor or the memory being configured for:
receiving a call by a conference bridge of the apparatus, the call being initiated by a first caller endpoint;
identifying a conference to which the call requests entry;
determining whether the conference bridge has available resources to process the call; and
enabling the call to join the conference via the conference bridge or a second conference bridge of a second caller endpoint participating in the conference according to whether the conference bridge has available resources to process the call;
wherein enabling the call to join the conference includes:
if it is determined that the conference bridge does not have available resources to process the call, identifying an available conference bridge via which the conference can be entered and assisting the call in being routed to the available conference bridge;
wherein identifying an available conference bridge via which the conference can be entered comprises:
identifying one or more caller endpoints currently participating in the conference;
identifying one or more of the identified caller endpoints that include a conference bridge;
ascertaining one or more of the identified caller endpoints that include a conference bridge having one or more available ports such that one or more available conference bridges are identified; and
selecting one of the identified available conference bridges;
wherein each of the one or more caller endpoints currently participating in the conference includes a telephone, a cellular phone, soft phone, or is otherwise capable of receiving and transmitting voice in accordance with Voice over IP.

14. The apparatus as recited in claim 13, further comprising:
at least one of the processor or the memory being configured with information identifying one or more caller endpoints that include conference bridges or being configured for receiving information identifying one or more caller endpoints that include conference bridges during call setup as part of capability exchange between the caller endpoints and the conference bridge that has received the call;
wherein identifying one or more of the identified caller endpoints that include a conference bridge is performed based, at least in part, upon the information.

15. The apparatus as recited in claim 14, wherein the information identifying the one or more caller endpoints that include conference bridges includes at least one of a type or model of the second caller endpoint.

16. The apparatus as recited in claim 13, wherein the available resources include one or more available ports.

17. The apparatus as recited in claim 13, further comprising:
at least one of the processor or the memory being further configured for:
providing a key to the first caller endpoint, thereby enabling the first caller endpoint to provide the key to the second conference bridge of the second caller endpoint participating in the conference to enable the first caller endpoint to gain access to the conference via the second conference bridge of the second caller endpoint.

18. The apparatus as recited in claim 13, further comprising:
at least one of the processor or the memory being further configured for:
receiving a notification from the second caller endpoint, the notification indicating that the second caller endpoint has conferencing resources that can be made available to the conference bridge, thereby enabling the conference bridge to extend its capacity to process calls that it receives.

19. The apparatus as recited in claim 13, at least one of the processor or the memory being further configured for identifying an available conference bridge via which the conference can be entered by identifying one of a plurality of available conference bridges, at least in part, according to a distance between the first caller endpoint and the second caller endpoint.

20. A method, comprising:
receiving a call by a first caller endpoint including a conference bridge associated therewith, the call requesting entry to a conference and being initiated by a second caller endpoint;
determining whether the first caller endpoint including the conference bridge is already connected to the conference;
authenticating the call by the first caller endpoint; and
determining by the first caller endpoint whether the call has been successfully authenticated; and
connecting the second caller endpoint that initiated the call to the conference via the conference bridge of the first caller endpoint according to whether the first caller endpoint including the conference bridge is already connected to the conference;
wherein connecting the second caller endpoint that initiated the call to the conference via the conference bridge of the first caller endpoint is performed if the first caller endpoint including the conference bridge is already connected to the conference and the call has been successfully authenticated;
wherein the first caller endpoint including the conference bridge includes a telephone, a cellular phone, soft phone, or is otherwise capable of receiving and transmitting voice in accordance with Voice over IP.

21. The method as recited in claim 20, further comprising:
receiving a key from the second caller endpoint that initiated the call, thereby enabling the first caller endpoint having the conference bridge to authenticate the second caller endpoint that initiated the call for use of conferencing resources of the conference bridge.

22. The method as recited in claim 20, wherein authenticating the call by the first caller endpoint comprises:
receiving a key from another conference bridge that had previously received the call, thereby enabling the first caller endpoint having the conference bridge to authenticate the second caller endpoint that initiated the call for use of conferencing resources of the first caller endpoint having the conference bridge; and
authenticating the call using the key.

23. The method as recited in claim 20, wherein authenticating the call by the first caller endpoint is performed by contacting another conference bridge via which the call was received.

24. An apparatus, comprising:
a processor; and
a memory, at least one of the processor or the memory being for:
receiving by the apparatus a call requesting entry to a conference, the call being initiated by a caller endpoint, wherein the apparatus is a second caller endpoint;
determining by the apparatus whether the apparatus is already connected to the conference, wherein the apparatus includes a conference bridge;
authenticating the call;
determining whether the call has been successfully authenticated; and
connecting the caller endpoint that initiated the call to the conference via the conference bridge of the apparatus according to whether the apparatus including the conference bridge is already connected to the conference;
wherein connecting the caller endpoint that initiated the call to the conference via the conference bridge of the apparatus is performed if the apparatus is already connected to the conference and the call has been successfully authenticated;
wherein the apparatus includes a telephone, a cellular phone, soft phone, or is otherwise capable of receiving and transmitting voice in accordance with Voice over IP.

25. The apparatus as recited in claim 24, further comprising:
at least one of the processor or the memory being further configured for:
receiving a key from the caller endpoint that initiated the call, thereby enabling the caller endpoint having the conference bridge to authenticate the caller endpoint that initiated the call for use of conferencing resources of the conference bridge.

26. The apparatus as recited in claim 24, further comprising:
at least one of the processor or the memory being further configured for:
receiving a key from another conference bridge that had previously received the call, thereby enabling the apparatus including the conference bridge to authenticate the caller endpoint that initiated the call for use of conferencing resources of the conference bridge of the apparatus; and
authenticating the call using the key.

27. The apparatus as recited in claim 24, further comprising:
at least one of the processor or the memory being further configured for authenticating the call by contacting another conference bridge via which the call was received.

28. The apparatus as recited in claim 24, further comprising:
at least one of the processor or the memory being further configured for:
determining by the apparatus whether the conference bridge has available resources to process the call;
wherein connecting the caller endpoint that initiated the call to the conference via the conference bridge of the apparatus is performed according to whether the apparatus including the conference bridge is already connected to the conference, whether the call has been successfully authenticated, and whether the conference bridge has available resources to process the call.

* * * * *